(12) United States Patent
Lercher

(10) Patent No.: US 7,866,145 B1
(45) Date of Patent: Jan. 11, 2011

(54) PARTICULATE EMISSION REDUCING DEVICE

(76) Inventor: Douglas E. Lercher, 611 Richmond St., Joliet, IL (US) 60435

( * ) Notice: Subject to any disclaimer, the term of this patent is extended or adjusted under 35 U.S.C. 154(b) by 890 days.

(21) Appl. No.: 11/799,820

(22) Filed: May 3, 2007

(51) Int. Cl.
*F01N 3/02* (2006.01)
(52) U.S. Cl. .............................. 60/311; 60/275; 60/295; 55/DIG. 30; 96/18; 96/23; 96/68; 96/79; 96/86
(58) Field of Classification Search .................. 60/274, 60/275, 295, 311; 55/DIG. 28, DIG. 30; 96/18, 20, 23, 26, 68, 79, 86, 87
See application file for complete search history.

(56) References Cited

U.S. PATENT DOCUMENTS

| | | | |
|---|---|---|---|
| 3,972,697 A | 8/1976 | Short, Jr. | |
| 4,871,515 A * | 10/1989 | Reichle et al. | 422/174 |
| 4,945,721 A * | 8/1990 | Cornwell et al. | 60/274 |
| 4,979,364 A * | 12/1990 | Fleck | 60/274 |
| 5,580,368 A | 12/1996 | Lu | |
| 5,950,424 A * | 9/1999 | Nojima | 60/275 |
| 6,058,698 A | 5/2000 | Coral et al. | |
| D452,694 S | 1/2002 | Irie | |
| 6,374,511 B1 | 4/2002 | Iwata | |
| 6,660,061 B2 * | 12/2003 | Josephson et al. | 95/2 |
| 6,773,477 B2 * | 8/2004 | Lindsay | 55/385.3 |
| 2004/0144083 A1 | 7/2004 | Ament | |

\* cited by examiner

*Primary Examiner*—Binh Q Tran

(57) ABSTRACT

Particulate emission reducing devices reduce particulate emissions from a vehicle. A housing is attached to a vehicle's exhaust pipe downstream of its muffler by an intake funnel having a desiccant bed and check valve. An ionizer is connected to the intake funnel. A collection unit is removably inserted into the housing through a collection unit opening with support bar notches in the housing's top downstream of the ionizer. Contacts in the bottom of the housing negatively charge collector plates, which collect positively charged particulates from the exhaust stream. Exhaust gases are emitted by an exhaust funnel attached to the housing downstream of the collection unit. A handle attached to the access panel of the collection unit facilitates removal of the collector plates for cleaning. The vehicle may include an indicator light to remind the user to clean the collector plates. The vehicle's trunk may include an access opening.

3 Claims, 4 Drawing Sheets

PARTICULATE EMISSION REDUCING DEVICE

BACKGROUND OF THE INVENTION

1. Field of the Invention

The present invention relates to a particulate emission reducing device for use in connection with vehicles with internal combustion engines. The particulate emission reducing device has particular utility in connection with reducing particulate emissions from a vehicle.

2. Description of the Prior Art

Particulate emission reducing devices are desirable for reducing particulate emissions from a vehicle. Pollution resulting from the operation of motor vehicles is increasingly recognized as a serious health and environmental problem. One source of pollution from vehicles that is not currently addressed by catalytic converters is fine particulates. Various devices are known for ionizing vehicle exhaust gas and/or collecting pollution particulates, but none is easily user serviceable so that they will operate at peak efficiency throughout the vehicle's life.

The use of air pollution control systems is known in the prior art. For example, U.S. Pat. No. 3,972,697 to Short, Jr. discloses an air pollution control system. However, the Short, Jr. '697 patent does not have an ionizer, and has further drawbacks of lacking collector plates.

U.S. Pat. No. 4,945,721 to Cornwell et al. discloses an electromagnetic converter for reduction of exhaust emissions that converts a substantial portion of the pollutants into nonharmful base elements. However, the Cornwell et al. '721 patent does not have collector plates that can be removed, washed, and replaced, and additionally does not allow the user to easily service the device to remove collected particulates.

Similarly, U.S. Pat. No. 6,374,511 to Iwata discloses an activation method of textile products and apparatus thereof that activates textile products. However, the Iwata '511 patent does not have collector plates, and cannot reduce particulate emissions from a vehicle.

In addition, U.S. Pat. No. 6,058,698 to Coral et al. discloses a device for purifying the exhaust gas of an internal combustion engine that breaks the peripheral electron bonds of the toxic or pollutant component molecules of the exhaust gas. However, the Coral et al. '698 patent does not have collector plates, and also does not collect particulates from an exhaust stream.

Furthermore, United States Patent Application Publication Number 2004/0144083 to Ament discloses an exhaust emission aftertreatment that controls a diesel engine to improve catalytic efficiency. However, the Ament 2004/0144083 patent application publication does not have an ionizer, and further lacks collector plates.

U.S. Pat. No. 5,580,368 to Lu discloses an exhaust gas cleaning device that cleans exhaust gas from car engines. However, the Lu '368 patent does not allow the user to remove, wash, and replace its collector surface, and has the additional deficiency of not being easily user serviceable.

Lastly, U.S. Pat. No. D452,694 to Irie discloses a catalytic converter that is an ornamental design for a catalytic converter. However, the Irie '694 patent does not have an ionizer, and also does not have collector plates.

While the above-described devices fulfill their respective, particular objectives and requirements, the aforementioned patents do not describe a particulate emission reducing device that allows reducing particulate emissions from a vehicle.

Therefore, a need exists for a new and improved particulate emission reducing device that can be used for reducing particulate emissions from a vehicle. In this regard, the present invention substantially fulfills this need. In this respect, the particulate emission reducing device according to the present invention substantially departs from the conventional concepts and designs of the prior art, and in doing so provides an apparatus primarily developed for the purpose of reducing particulate emissions from a vehicle.

SUMMARY OF THE INVENTION

In view of the foregoing disadvantages inherent in the known types of air pollution control systems now present in the prior art, the present invention provides an improved particulate emission reducing device, and overcomes the above-mentioned disadvantages and drawbacks of the prior art. As such, the general purpose of the present invention, which will be described subsequently in greater detail, is to provide a new and improved particulate emission reducing device which has all the advantages of the prior art mentioned heretofore and many novel features that result in a particulate emission reducing device which is not anticipated, rendered obvious, suggested, or even implied by the prior art, either alone or in any combination thereof.

To attain this, the present invention essentially comprises a hollow housing with an open top and opposing open ends. An ionizer is attached to one of its opposing open ends. A contact is attached to the housing's interior. A collection unit is removably enclosed by the housing.

There has thus been outlined, rather broadly, the more important features of the invention in order that the detailed description thereof that follows may be better understood and in order that the present contribution to the art may be better appreciated.

The invention may also include the ionizer having a plurality of wires with their opposing ends attached to a plurality of brackets by a plurality of screws. The collection unit may comprise a first support bar and a second support bar connected to the opposing sides of a side support at one end and the opposing sides of an access panel at their opposing end. A collector plate may have its opposing ends attached to the side support and the access panel. There may be a handle attached to the access panel. There may be an intake funnel attached to the ionizer. The intake funnel may contain a desiccant bed within its interior and may have a check valve in fluid communication with its exterior. There may be an exhaust funnel attached to the open end of the housing opposite the ionizer. The particulate emission reducing device may be connected to a vehicle's exhaust pipe downstream of a muffler. The opposing sides of the collector plate may define first and second notches. The side support and the access panel may each have collector plate supports attached to them. There may be a bolt hole defined by the housing. The top of the housing may define a collection unit opening. The top of the housing may define a plurality of support bar notches. A contact may be attached to the housing's bottom. The invention may be an improvement to a vehicle. An indicator light may be attached to the vehicle's dashboard. The vehicle's trunk may define an access opening. There are, of course, additional features of the invention that will be described hereinafter and which will form the subject matter of the claims attached.

Numerous objects, features, and advantages of the present invention will be readily apparent to those of ordinary skill in the art upon a reading of the following detailed description of presently current, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved particulate emission reducing device that has all of the advantages of the prior art air pollution control systems and none of the disadvantages.

It is another object of the present invention to provide a new and improved particulate emission reducing device that may be easily and efficiently manufactured and marketed.

An even further object of the present invention is to provide a new and improved particulate emission reducing device that has a low cost of manufacture with regard to both materials and labor, and which accordingly is then susceptible of low prices of sale to the consuming public, thereby making such particulate emission reducing device economically available to the buying public.

Still another object of the present invention is to provide a new particulate emission reducing device that provides in the apparatuses and methods of the prior art some of the advantages thereof, while simultaneously overcoming some of the disadvantages normally associated therewith.

Even still another object of the present invention is to provide a particulate emission reducing device for reducing particulate emissions from a vehicle. This allows a motor vehicle to be operated without polluting the environment by producing large amounts of particulate emissions.

Still yet another object of the present invention is to provide a particulate emission reducing device for reducing particulate emissions from a vehicle. This makes it possible for the user to easily clean particulates from the collection plates.

An additional object of the present invention is to provide a particulate emission reducing device for reducing particulate emissions from a vehicle. This enables the particulate emission reducing device to remove particulates from a motor vehicle's exhaust stream.

A further object of the present invention is to provide a particulate emission reducing device for reducing particulate emissions from a vehicle. This reminds the user to clean the collector plates.

Lastly, it is an object of the present invention to provide a new and improved particulate emission reducing device for reducing particulate emissions from a vehicle.

These together with other objects of the invention, along with the various features of novelty that characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there is illustrated current embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE CURRENT EMBODIMENT

Figure 1:
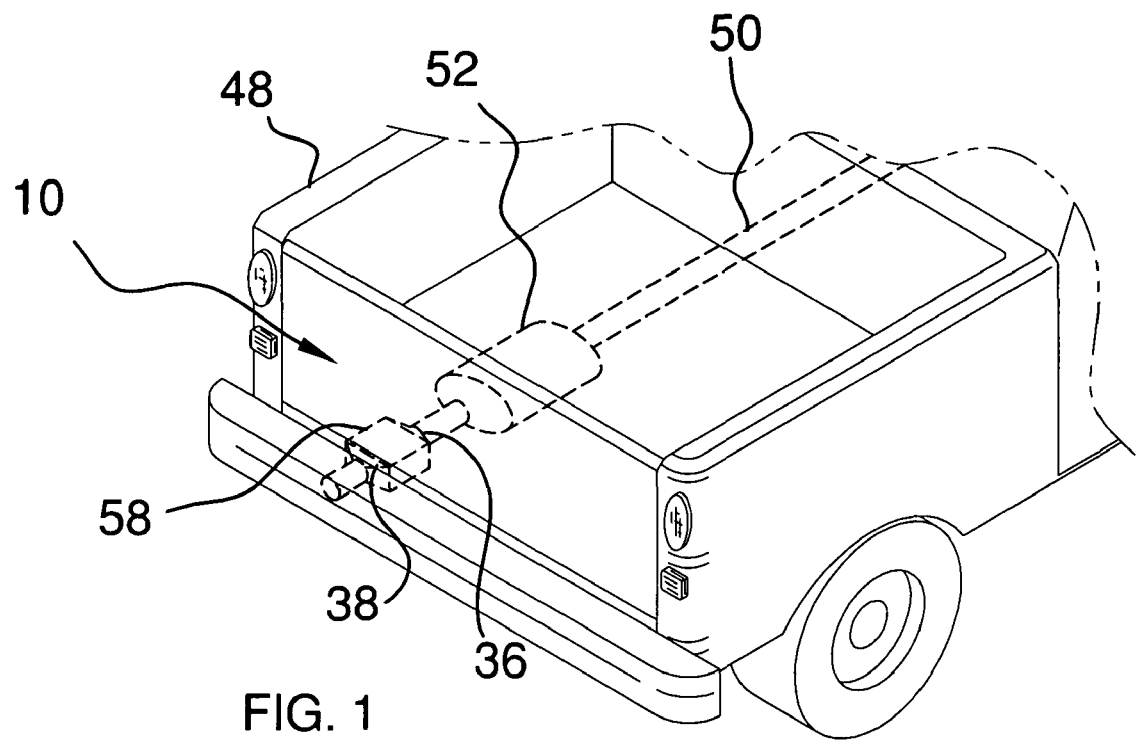
FIG. 1 is a top perspective view of the current embodiment of the particulate emission reducing device constructed in accordance with the principles of the present invention.

Referring now to the drawings, and particularly to FIGS. 1-8, a current embodiment of the particulate emission reducing device of the present invention is shown and generally designated by the reference numeral 10.

In FIG. 1, a new and improved particulate emission reducing device 10 of the present invention for reducing particulate emissions from a vehicle is illustrated and will be described. More particularly, the particulate emission reducing device 10 is shown in use installed on vehicle 48, which is a pickup truck in FIG. 1. Vehicle 48 has exhaust pipe 50 extending from its internal combustion engine (not shown). Exhaust pipe 50 empties into muffler 52. Particulate emission reducing device 10 is installed downstream of muffler 52. The exhaust exits muffler 52 and enters housing 58 via intake funnel 36. After particulates are removed from the exhaust stream within housing 58, the exhaust exits via exhaust funnel 38 into the environment. In the current embodiment, intake funnel 36, housing 58, and exhaust funnel 38 are made of stainless steel to prevent corrosion. Particulate emission reducing device 10 is generally in the shape of a rectangular prism about 2 inches tall, 12 inches long, and 4 inches wide.

Figure 2:
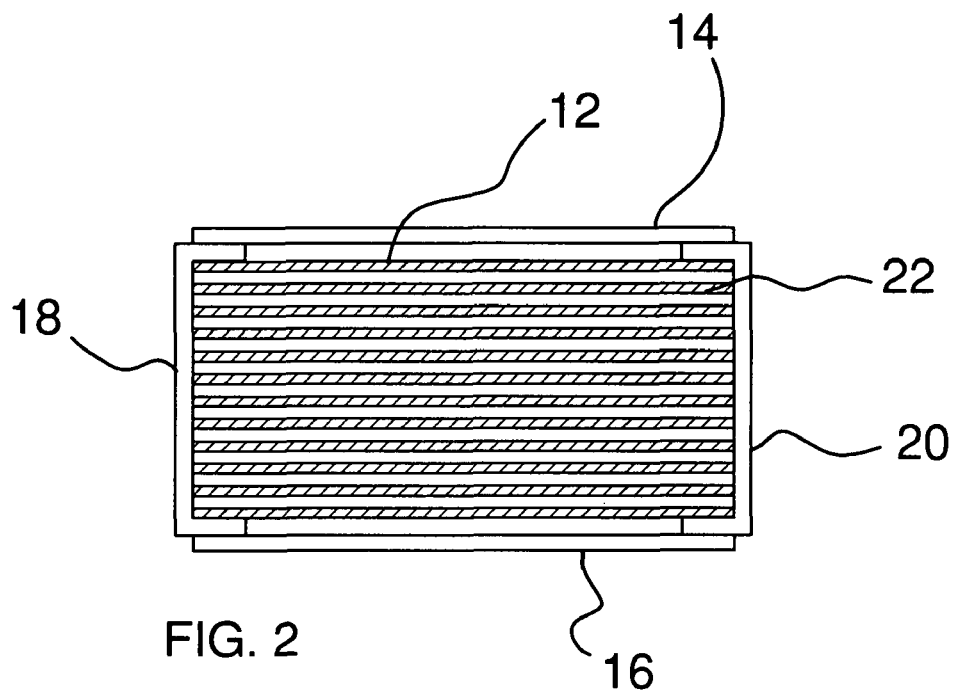
FIG. 2 is a front side sectional view of the collection unit of the particulate emission reducing device of the present invention.

Moving on to FIG. 2, a new and improved collection unit 12 of the present invention for reducing particulate emissions from a vehicle is illustrated and will be described. More particularly, the collection unit 12 is removably inserted into housing 58. Collection unit 12 has first support bar 14, second support bar 16, side support 18, and access panel 20 that support a plurality of collector plates 22. In the current embodiment, collection unit 12 is made of stainless steel to prevent corrosion. Collector plates 22 are $\frac{1}{16}$" thick and are separated by 0.32" in the current embodiment.

Figure 3:
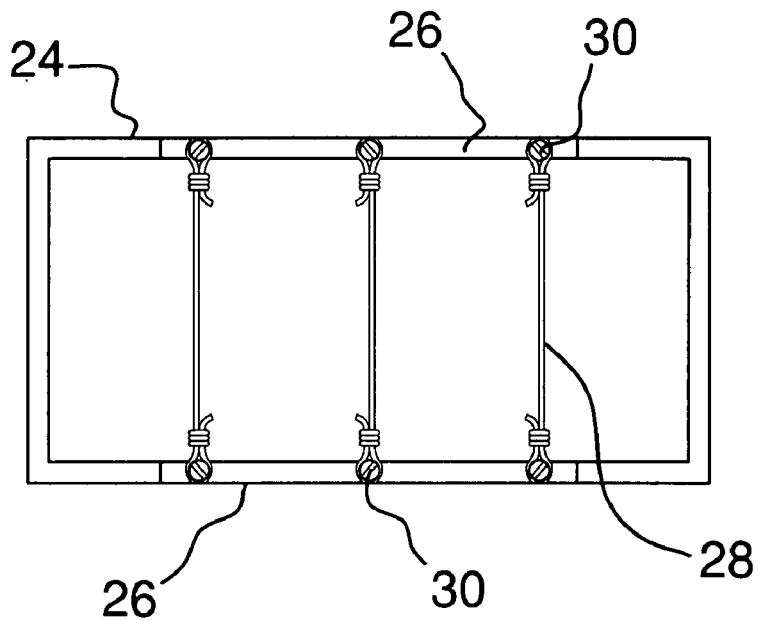
FIG. 3 is a front side view of the ionizer of the particulate emission reducing device of the present invention.

Continuing with FIG. 3, a new and improved ionizer 24 of the present invention for reducing particulate emissions from a vehicle is illustrated and will be described. More particularly, the ionizer 24 is attached to housing 58 downstream of intake funnel 36 and upstream of collection unit 12. Ionizer 24 is a positive ion field generator and is about ½" thick in the current embodiment. Wires 28 are secured by screws 30 to two L-shaped brackets 26. Wires 28 are made of solid copper and are spaced 1 inch apart in the current embodiment. L-shaped brackets 26 are about 2½ inches wide in the current embodiment.

Figure 4:
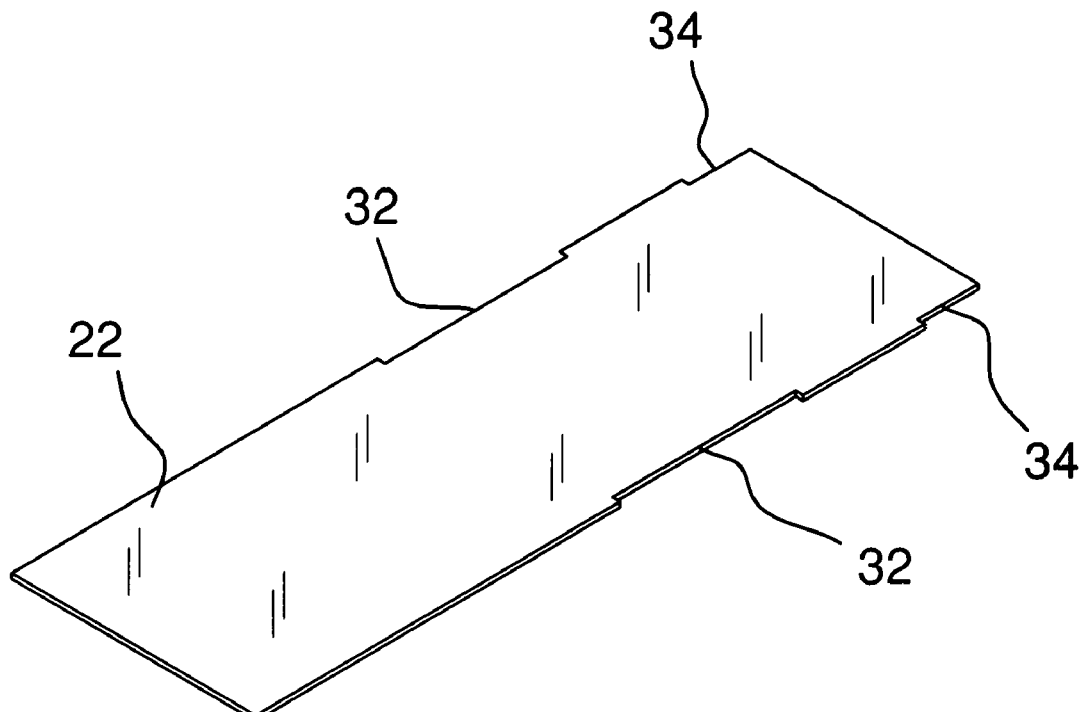
FIG. 4 is a top perspective view of the collector plate of the particulate emission reducing device of the present invention.

In FIG. 4, a new and improved collection plate 22 of the present invention for reducing particulate emissions from a vehicle is illustrated and will be described. More particularly, the collector plate 22 has first notches 32 and second notches 34 in its opposing sides. In the current embodiment, collector plate 22 is 4 inches wide, the distance from the side opposite the second notches 34 to the beginning of the first notches 32 is 6 inches, the first notches 32 are 3 inches wide, the distance from the end of the first notches 32 to the beginning of the second notches 34 is 2 inches, the second notches 34 are 1 inch wide, and the first notches 32 and second notches 34 are 0.125 inches deep.

Furthermore, in FIG. 5, a new and improved housing 58 of the present invention for reducing particulate emissions from a vehicle is illustrated and will be described. More particularly, the housing 58 has collection unit, opening 60 in its top with support bar notches 42 so that collection unit 12 can be removably inserted into housing 58. Bolts (not shown) are inserted through bolt holes 44 to removably secure collection unit 12 in place within housing 58. Contacts 40 in the bottom of housing 58 are spaced to electrically engage with first notch 32 and second notch 34 of collector plates 22. When powered by vehicle 48's electrical system, contacts 40 create a negative charge on collector plates 22. Particulate emissions flowing through intake funnel 36 from exhaust pipe 50 pass through ionizer 24. Ionizer 24 imparts a positive charge to the particulate emissions. The negatively charged collector plates 22 then attract the particulate emissions, which subsequently collect on collector plates 22 instead of passing out exhaust funnel 38 into the environment. The interior of housing 58 is treated with a nonconductive and heat resistant material so that particulate emissions will not collect on housing 58 and so that the hot exhaust gases will not damage housing 58.

Figures 5, 6:
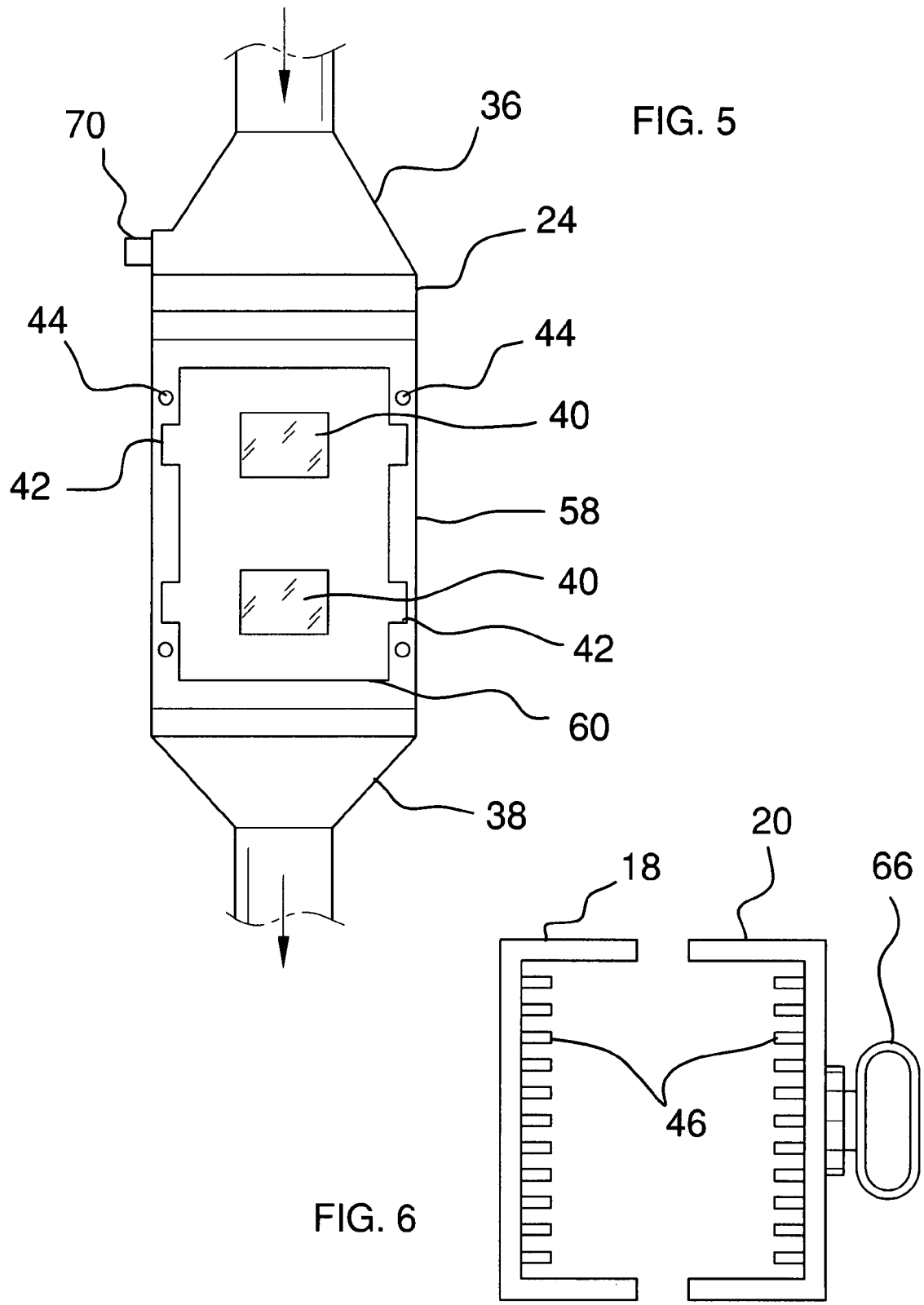
FIG. 5 is a top view of the housing of the particulate emission reducing device of the present invention.
FIG. 6 is a front side view of the side support and access panel of the particulate emission reducing device of the present invention.

In FIG. 6, a new and improved side support 18 and access panel 20 of the present invention for reducing particulate emissions from a vehicle are illustrated and will be described. More particularly, the side support 18 and access panel 20 have collector plates supports 46 mounted on their interior to support collector plates 22. Access panel 20 has handle 66 attached to its exterior to facilitate the insertion and removal of collection unit 12 from housing 58.

Figure 7:
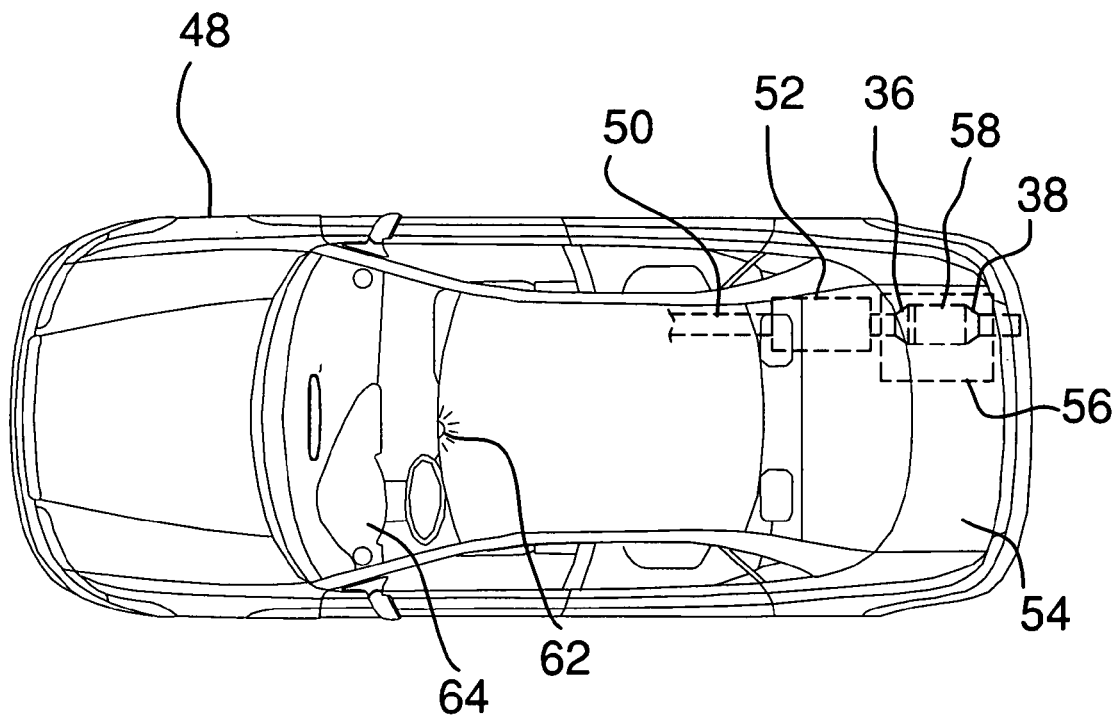
FIG. 7 is a top view of the particulate emission reducing device of the present invention.

Moving on to FIG. 7, a new and improved particulate emission reducing device 10 of the present invention for reducing particulate emissions from a vehicle is illustrated and will be described. More particularly, the particulate emission reducing device 10 is shown in use installed on vehicle 48, which is a car in FIG. 7. As was the case in FIG. 1, particulate emission reducing device 10 is installed downstream of muffler 52. Vehicle 48 has been provided with an access opening 56 in trunk 54 so that the user can easily access particulate emission reducing device 10 to remove collection unit 12 when collector plates 22 need to be cleaned. Indicator light 62 on dashboard 64 provides the user with a visual reminder to clean collector plates 22. The frequency of the illumination of indicator light 62 could be based on the passage of time between cleanings, vehicle 48's mileage between cleanings, measurement of exhaust back pressure resulting from the build up of particulates on collector plates 22, or a direct measurement of the build up of particulates on collector plates 22.

Figure 8:
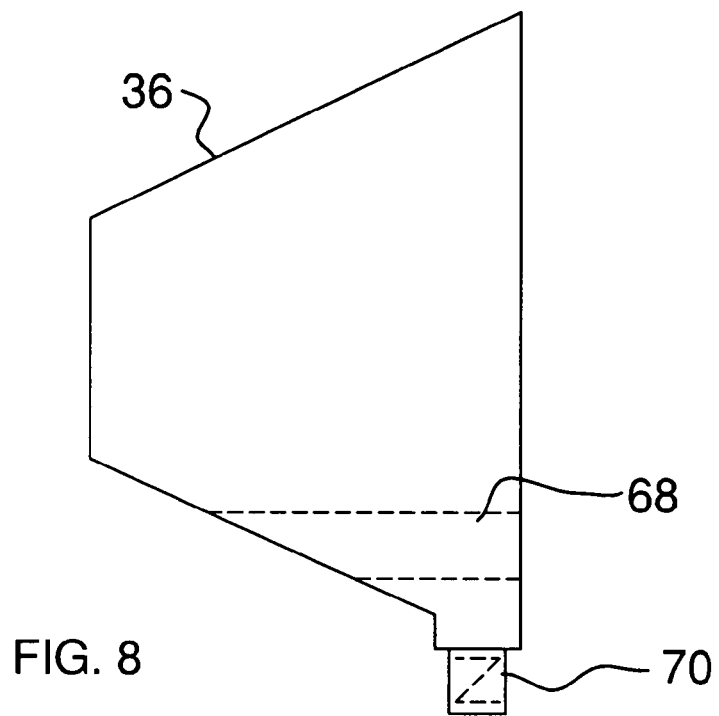
FIG. 8 is a top view of the intake funnel of the particulate emission reducing device of the present invention.

Concluding with FIG. 8, a new and improved intake funnel 36 of the present invention for reducing particulate emissions from a vehicle are illustrated and will be described. More particularly, the intake funnel 36 has desiccant bed 68 in its interior and check valve 70 in fluid communication with the exterior of intake funnel 36. Desiccant bed 68 attracts and removes moisture from the exhaust stream as it passes through intake funnel 36. Accumulated moisture drains through check valve 70.

In use, it can now be understood that particulate emission reducing device 10 is installed downstream of muffler 52 on vehicle 48. Responsive to indicator light 62 lighting, the user removes collection unit 12 from housing 58 and cleans collector plates 22 with soap and water. The user then returns collection unit 12 to housing 58.

While a current embodiment of the particulate emission reducing device has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy, electrically conductive, and corrosion resistant material may be used instead of the stainless steel housing and collector plates described. Also, the copper wires may also be made of any other appropriate electrically conductive and ionizing material. And although reducing particulate emissions from a vehicle has been described, it should be appreciated that the particulate emission reducing device herein described is also suitable for reducing particulate emissions from a wide variety of devices. Furthermore, a wide variety of vehicles may be used instead of the car and truck described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A particulate emission reducing device comprising:
   a hollow housing having a top, a bottom, and opposing open ends;
   a collection unit opening, wherein said top of said housing defines a hole therein to comprise said collection unit opening;
   a plurality of support bar notches, wherein said top of said housing defines notches therein to comprise said support bar notches;
   an ionizer attached to one of said opposing open ends of said housing;
   a contact attached to said bottom of said housing; and
   a collection unit removably enclosed by said housing; said collection unit comprising:
      a first support bar having opposing ends;

a side support having opposing sides with one of said opposing sides attached to one of said opposing ends of said first support bar;

a second support bar having opposing ends with one of said opposing ends attached to one of said opposing sides of said side support opposite said first support bar;

an access panel having opposing sides with said opposing sides attached to one of said opposing ends of said first support bar and said second support bar opposite said side support; and a collector plate having opposing ends and opposing sides with said opposing ends attached to said side support and said access panel.

2. The particulate emission reducing device as defined in claim 1, further comprising a handle attached to said access panel.

3. In combination with a vehicle, including an exhaust pipe, a muffler, a dashboard, and a trunk, the improvement which comprises:

an intake funnel attached to said exhaust pipe downstream of said muffler, wherein said intake funnel contains a desiccant bed within its interior and has a check valve in fluid communication with its exterior;

an ionizer attached to said intake funnel downstream of said intake funnel;

a hollow housing having a top, a bottom, and opposing open ends with one of said opposing open ends attached to said ionizer;

a collection unit opening, wherein said top of said housing defines a hole therein to comprise said collection unit opening;

a plurality of support bar notches, wherein said top of said housing defines notches therein to comprise said support bar notches;

a contact attached to said bottom of said housing;

a collection unit removably enclosed by said housing; aid collection unit comprising:

a first support bar having opposing ends;

a side support having opposing sides with one of said opposing sides attached to one of said opposing ends of said first support bar;

a second support bar having opposing ends with one of said opposing ends attached to one of said opposing sides of said side support opposite said first support bar, an access panel having opposing sides with said opposing sides attached to one of said opposing ends of said first support bar and said second support bar opposite said side support;

a handle attached to said access panel; and a collector plate having opposing ends and opposing sides with said opposing ends attached to said side support and said access panel; and an exhaust funnel attached to one of said opposing open ends of said housing downstream of said collection unit.

* * * * *